US012338797B2

(12) United States Patent
Sanz Pascual et al.

(10) Patent No.: US 12,338,797 B2
(45) Date of Patent: Jun. 24, 2025

(54) SYSTEM FOR PROTECTION AGAINST LIGHTNING STRIKES FOR A MODULAR BLADE AND METHOD OF FORMING A STACK

(71) Applicant: NABRAWIND TECHNOLOGIES, SL, Pamplona (ES)

(72) Inventors: Eneko Sanz Pascual, Pamplona (ES); Javier Callen Escartín, Huesca (ES); Javier Monreal Lesmes, Zizur Mayor (ES); Arantxa Esparza Zabalza, Pamplona (ES); Ion Arocena De La Rúa, Pamplona (ES)

(73) Assignee: NABRAWIND TECHNOLOGIES, SL, Pamplona (ES)

(*) Notice: Subject to any disclaimer, the term of this patent is extended or adjusted under 35 U.S.C. 154(b) by 101 days.

(21) Appl. No.: 18/006,938

(22) PCT Filed: Jul. 27, 2020

(86) PCT No.: PCT/ES2020/070485
§ 371 (c)(1),
(2) Date: Jan. 26, 2023

(87) PCT Pub. No.: WO2022/023586
PCT Pub. Date: Feb. 3, 2022

(65) Prior Publication Data
US 2023/0272782 A1 Aug. 31, 2023

(51) Int. Cl.
*F03D 80/30* (2016.01)
*F03D 1/06* (2006.01)
(52) U.S. Cl.
CPC ........... *F03D 80/30* (2016.05); *F03D 1/0675* (2013.01); *F05B 2230/23* (2013.01); *F05B 2240/302* (2013.01)

(58) Field of Classification Search
CPC ...... F03D 1/0675; F03D 1/0677; F03D 80/30; F05B 2240/302
See application file for complete search history.

(56) References Cited

U.S. PATENT DOCUMENTS 8,562,296 B2 * 10/2013 Arocena De La Rua .................... F03D 80/30
416/232
9,816,482 B2 * 11/2017 Caruso .................. F03D 1/0675
(Continued)

FOREIGN PATENT DOCUMENTS

EP 1561947 A2 8/2005
EP 1664528 A1 6/2006
(Continued)

OTHER PUBLICATIONS

International Search Report and Written Opinion issued on Oct. 5, 2020, in corresponding International Application No. PCT/ES2020/070485, 13 pages.

*Primary Examiner* — Sang K Kim
(74) *Attorney, Agent, or Firm* — Maier & Maier, PLLC

(57) ABSTRACT

A lightning protection system for the joint of a modular blade. The joint comprises a number of coated metal elements by Xpacer equipotentially bonded with a number of stacks disposed at the sides of the upper cap and the lower cap and with the lightning down-drop. The preforms of the joint include two stacks at the leading edge and another two stacks at the trailing edge. The stacks are formed by layers of carbon fibre and layers of glass fibre, replaced by copper mesh as from the equipotentiation line. The stack incorporates at the side thereof a metal strip joined to the metal strip that links the tip cap and the root cap, and is coated with a layer of glass fibre.

9 Claims, 6 Drawing Sheets

(56) References Cited

U.S. PATENT DOCUMENTS

| | | | | |
|---|---|---|---|---|
| 11,215,167 B2* | 1/2022 | Girolamo | .............. | F03D 1/0675 |
| 11,441,536 B2* | 9/2022 | Burchardt | ............. | F03D 80/301 |
| 11,668,276 B2* | 6/2023 | García Ayerra | ....... | F03D 1/0675 |
| | | | | 416/241 R |
| 2023/0041394 A1* | 2/2023 | Eiriksson | ................ | F03D 80/30 |

FOREIGN PATENT DOCUMENTS

| | | |
|---|---|---|
| EP | 1692752 A1 | 8/2006 |
| EP | 1826402 A1 | 8/2007 |
| EP | 1950414 A2 | 7/2008 |
| EP | 2282057 A1 | 2/2011 |
| EP | 3184814 A1 | 6/2017 |
| WO | 2017144449 A1 | 8/2017 |
| WO | 2019068294 A1 | 4/2019 |
| WO | 2020094633 A1 | 5/2020 |
| WO | 2020103991 A1 | 5/2020 |

* cited by examiner

SYSTEM FOR PROTECTION AGAINST LIGHTNING STRIKES FOR A MODULAR BLADE AND METHOD OF FORMING A STACK

FIELD OF INVENTION

A lightning protection system for the joint of a modular blade comprising two modular parts joined together, the root zone or inboard and the tip zone or outboard and the method of forming a stack housing the metal elements of the joint of the blade.

BACKGROUND

For the protection system against lightning strikes in a wind turbine blade to be effective, all the conductive elements that do not carry current must be in equipotential bonding electrically linked to the lightning transmission cable. Carbon fibre, as a conductive material, must be equipotentially bonded with the lightning rod system. The problem of leaving conductive elements isolated is the high difference in potential created between them due to the induction phenomena caused by the lightning as it passes through the lightning protection system.

The stacking that houses the metal elements of the joint is very thick. As constructively it is very difficult to infuse such great thicknesses, it is resorted to the incorporation of glass fibre layers or fabrics sandwiched between the carbon fibre layers or fabrics. The laminate thus formed distributes the resin during infusion and allows the use of great thicknesses. What happens is that, by adding glass fibre, an insulating effect is produced. This difference in potential can lead to an electric arc jump that must be avoided.

For this, there are different solutions in the state of the art that apply both to integral blades and to modular blades. The first group includes the following:

Patent application EP1826402A1 uses a plate integrated in carbon fibre as a bypass of the main lightning cable. This plate is placed during the lamination and curing process. A nanocomposite based on a conductive resin, laminated in the construction process of the blade beam, is also described.

Patent application EP1692752A1 connects the carbon fibre with the lightning cable through a potential equalization member that is an electrical conductor. Said electrical conductor is a flexible metallic tape or a flexible mesh that is added over the carbon fibre to improve its conductivity, (since the conductivity is not very good in the longitudinal direction of the fibres).

Patent application EP1664528A1 presents a protection method with a fibre-reinforced main layer connected to a receiver and a lightning cable. The fibres can be carbon fibre, steel fibres, etc. In one embodiment, a stack of glass fibre and carbon fibre (7:1 ratio) is described in which, to compensate for the lack of conductive glass fibre, a glued receiver (with silver glue that is conductive) is added to a layer of steel fibres that is added to obtain the equipotential difference of the assembly.

Regarding the modular blades, the lightning strikes the receiver located at the tip of the blade and travels through the internal cable to the root of the blade, to eventually travel to the ground. When the blade has a discontinuity in its structure, all the elements that make up the discontinuity must be equipotentially bonded and joined to the cable that transfers the lightning strike.

Patent application EP1561947A1 places a metal plate between the two parts of the modular blade and an electrical conduction wire internal to the blade. When lightning strikes, it is possible to guide the current to the outside of the blade through the metal plate and the electrical conduction wire. The joint is completed with a nut, a bolt and its corresponding plate.

Patent application EP1950414A1 presents a modular blade made of fibre-reinforced plastic (FRP). In this way, the non-conductive parts are joined by means of fixing elements consisting of fasteners arranged on the inside of the blade and a lightning discharge conductive cable is added to all of this. The fixing elements are arranged inside their corresponding holes and are covered with a non-conductive cover but which is passed-through by some protruding fasteners. An extension of the lightning conductor cable is connected to each of the fasteners.

Patent application EP2282057A1 presents a mesh for equipotentially bonding and reinforcing fibre blades, whose cables are grouped at tapered ends to achieve a connection point. The different reorganizations of the cables present different practical realizations: In the case of a modular blade, the cross cables are intertwined forming the tapered end (which connects their free ends). Longitudinal wires create the joint, but with multiple tapered ends. In another embodiment for a modular blade, an L-shaped contact strip is used, which creates the physical connection.

Patent application WO2020094633A1 describes an internal carbon fibre beam to which a conductive element is added to equipotentially bond the assembly. Said conductive element extends along the outside of the main beam structure or along a corner of the outside of the main beam structure. The beam may consist of a double beam or a single beam. It also contemplates the modularity of the blade by assembling the aforementioned beams.

These analysed solutions constitute the state of the art, but adopt different forms of integration between the fibre stacks and the metal elements of the present proposal. The most important differences presented in this invention are the sectorial equipotential bonding of the layers adjacent to the metal joining elements, together with the joining of the metal elements themselves and of the lightning cable. This technical solution, as presented in the main claim, is not present in any previous patent.

SUMMARY

The invention is aimed at:
equipotentially bonding the layers of composite material, a combination of carbon with glass, which house the metal elements of the joint, and
equipotentially bonding the metal elements of the joint of a modular blade.

It is an object of the invention that the carbon fibre and glass fibre layers that form part of the joint area of the modular blade, as well as the metal elements that make up the joint, are equipotentially bonded when connected to the lightning down-drop and, therefore, the lightning impact does not damage them.

It is another object of the invention that the layers corresponding to glass fibre and which are not conductive, are replaced with a copper mesh or an aluminium mesh, both being conductive materials. The carbon fibre layers, which are conductors and are intermingled with the glass fibre ones, from a certain point are only intermingled with several copper meshes, equipotentially bonding the whole assembly.

The stack of layers of the invention comprises several folds of carbon fibre interspersed with several copper meshes and covered by a glass fibre covering the entire assembly.

It also includes inside a metal strip for:
the connection with the metal joining elements and
the connection with the lightning down-drop.

The lightning protection system is located on cap or the wing of the blade and covers the same width as the preform that forms the joint. The equipotential stacking is infused at the same time that the cap is formed. It is not a dressing that is added to the side of the cap after its manufacture.

The following advantages arise from what has been described above. The stack formed has such a thickness that it favours the handling of the copper mesh during its manufacture, folding it and inserting the metal strip inside it quickly and easily. Covering the entire exterior of the stack with glass fibre favours the subsequent infusion process, providing the assembly with adequate protection.

BRIEF DESCRIPTION OF THE DRAWINGS

A brief description will be given below for a series of drawings useful for better understanding the invention and that expressly relate to an embodiment of said invention that is presented as a non-limiting example thereof.

DETAILED DESCRIPTION

Figure 1:
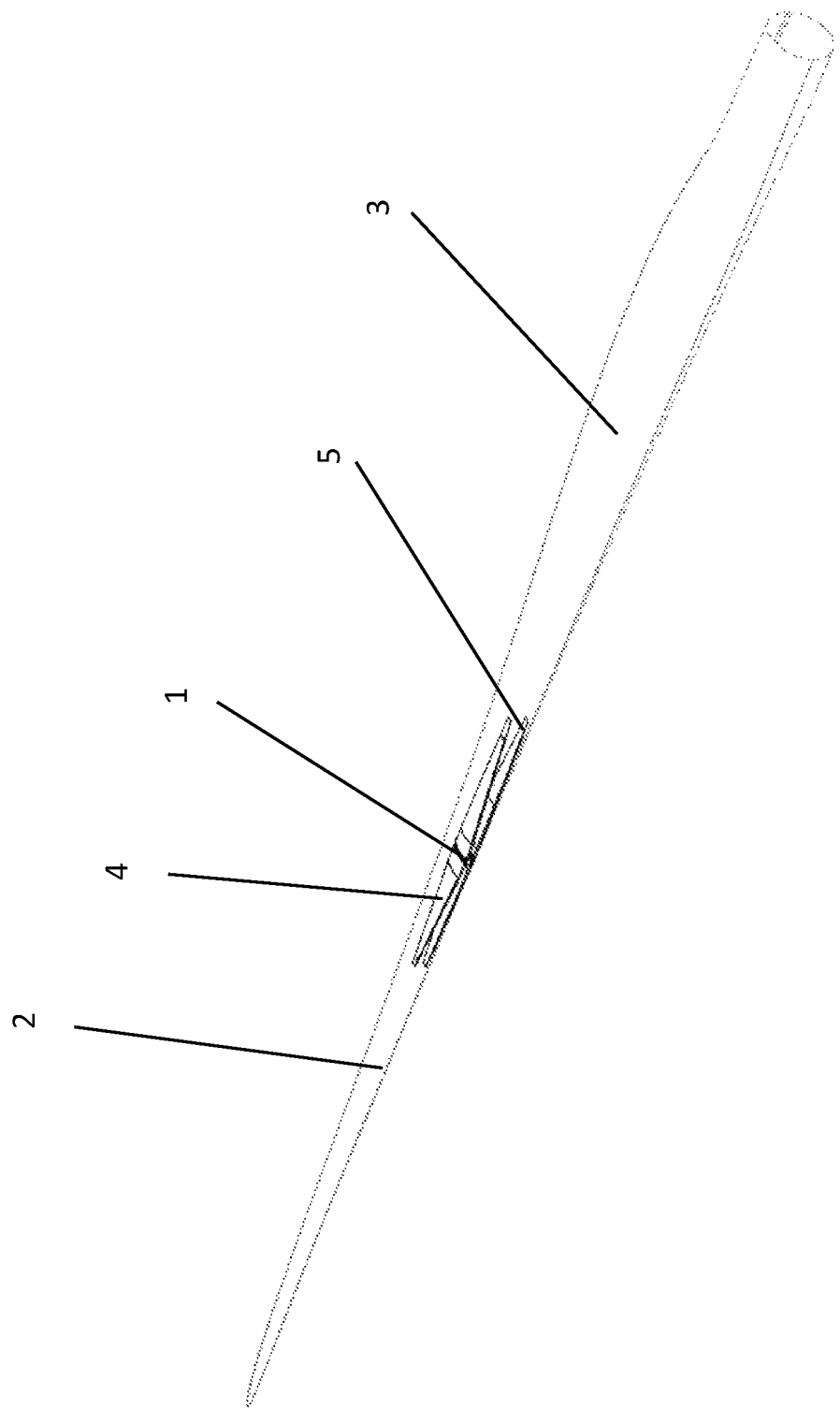
FIG. 1 represents the outline of a modular blade with the two joining preforms overlapping inside it.

The blade of a wind turbine has a tip and a root. If, in addition, the blade is modular, like the one shown in FIG. 1, two parts are configured from the joint area (1), the tip area (2) from the joint to the tip and the root area (3) from the joint to the root. The blade has an internal structure consisting of two caps and two webs consisting of composite material that form an internal beam on which the upper and lower shells are arranged. The metal elements conforming the joint of this modular blade are arranged in the upper cap (4) and in the lower cap (5). Said caps (4 and 5) and their corresponding webs, together with the joining area (1), constitute two preforms, one upper and one lower, which overlap on the original beam structure of the blade. So that, as they move away from the junction point (1), the cap narrows and thins its thickness so that the overlap with the rest of the interior of the blade is more effective. The material used in the cap is glass fibre and carbon fibre in a ratio of 20% to 80%.

Figure 2A:
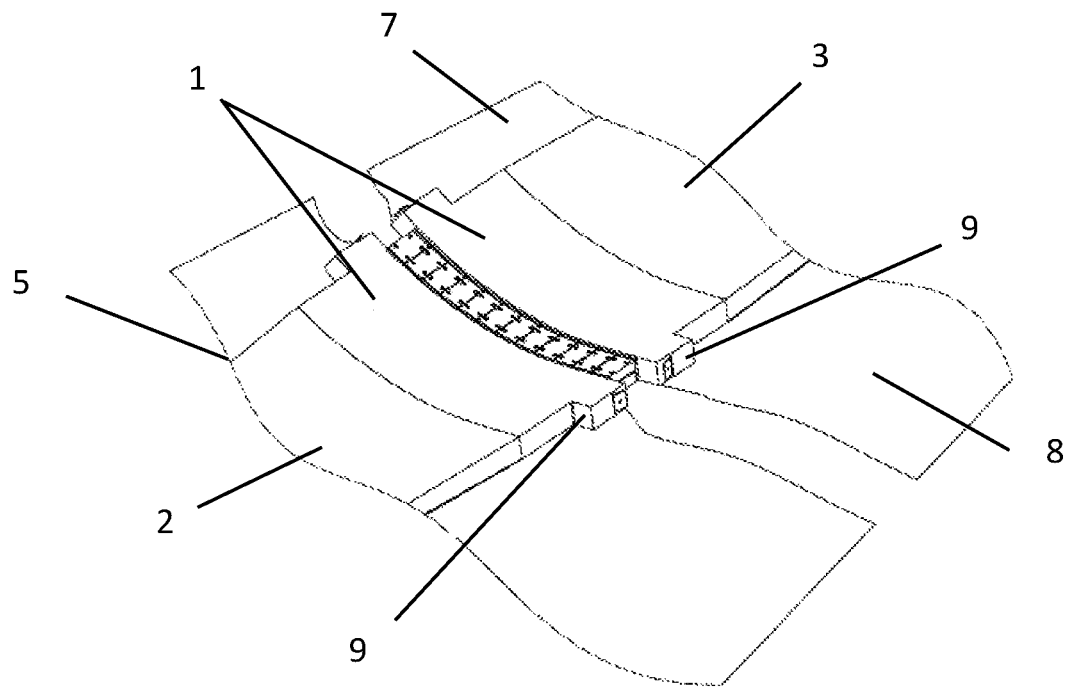
FIG. 2a represents a part of the lower cap of the preform of FIG. 1, with the arrangement of the equipotentially bonding of the stack.

FIG. 2a shows the joining area (1) of the lower cap (5) with its tip side (2) and its root side (3). Said metal joint rests on the lower shell of the blade and due to its aerodynamic configuration, the preform of the joint is closer to the leading edge (7) and further from the trailing edge (8). On both sides of the lower cap (5) is where the stack (9) is arranged, equipotentially bonding the composite material that houses the metal elements of the joint. The lightning protection system of the lower cap (5) shown in FIGS. 2a and 2b, has two stacks (9) on the leading edge (7) and another two stacks (9) on the trailing edge (8).

In a second practical embodiment shown in FIG. 2b, the sides of the lower cap (5) house some centring pins (10) that help to complete the in-situ assembly of the modular blade and that are subsequently removed. In the event that the joint (1) has these pins (10), the stack (9) moves towards the interior of the tip zone (2) and the root zone (3) respectively, but maintains its dimensions in both cases.

The stack (9) is approximately 150 mm or 250 mm long and 50 mm or 80 mm wide. Measured from the joint area (1) and more specifically from the last metal element that makes up the joint.

Figure 3:
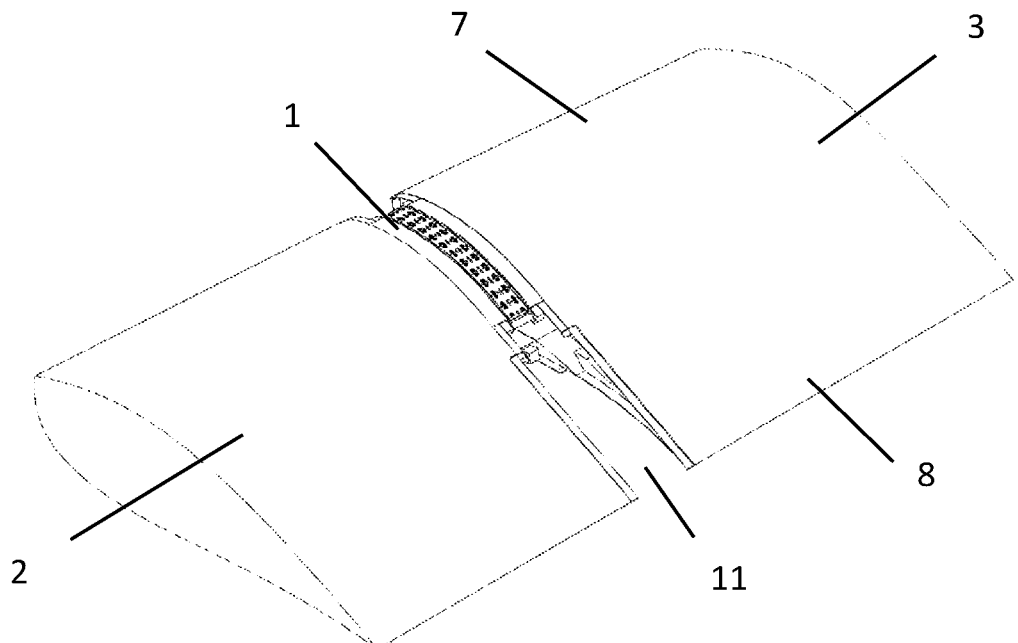
FIG. 3 shows a detail of the joint of a modular blade.

FIG. 3 shows a section of the modular blade object of the invention. It includes the tip area (2), the root area (3), the leading edge (7), the trailing edge (8) and the joint area (1) covered by the metal elements that constitute the joint itself: The set of Xpacers® that cover and prestress the union bolts, which in turn are threaded in their corresponding inserts, which are glued to the laminated combination of carbon fibre and glass fibre that must be equipotentially bonded. The Xpacers are spacers, and are the metal elements visible when the joint is completed. The shells that cover the blade have holes (11) in the joint area (1) to allow access during assembly. Subsequently, these holes (11) will be covered with a hull.

Figure 4:
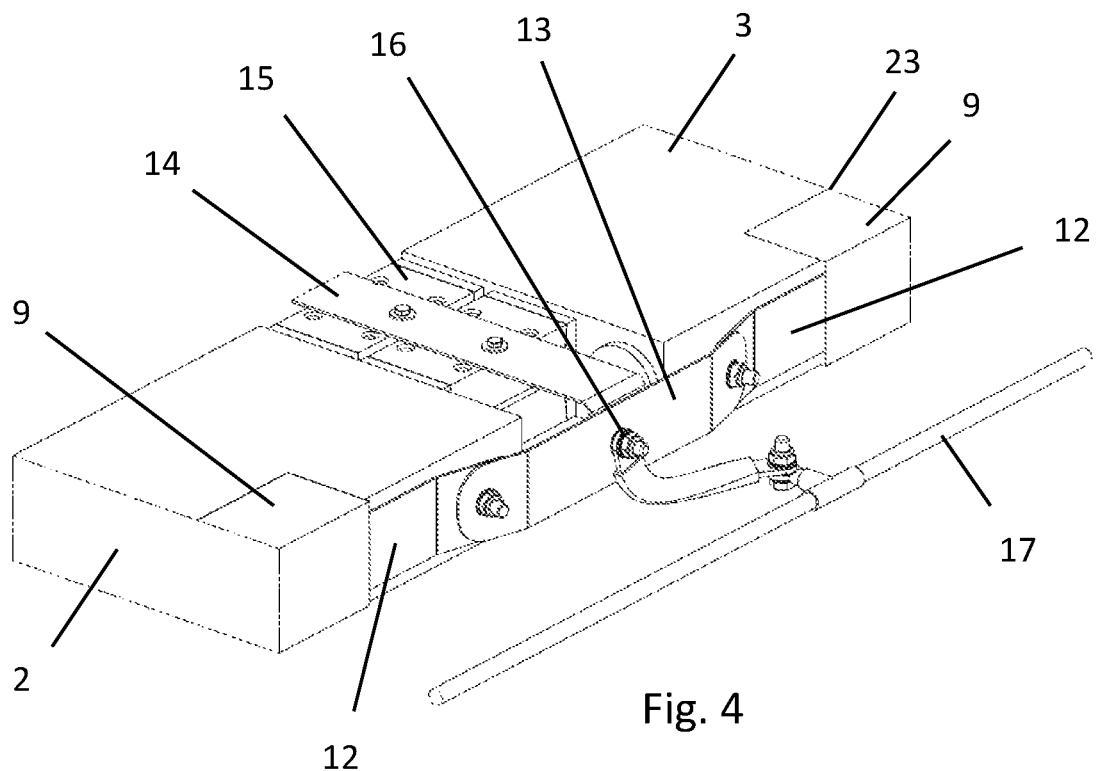
FIG. 4 shows a detail of FIG. 2b with all the electrical connections of the lightning protection system.

As shown in the practical embodiment of FIG. 4, the stacks (9) fitted with the trailing edge (8) comprise a metal strip (12) that protrudes from its interior. Said strip (12) has a hole for its connection with other elements. The stack (9) of the tip (2) and the stack (9) of the root (3) corresponding to the lower cap (5) are joined together with another metal strip (13) screwed through the corresponding connection holes of the metal strip (12) mentioned above. This union is complemented by the metal strip (14) that covers all of the Xpacers (15). Said metal strip (14) is screwed to each and every one of the Xpacers (15) contained in the joining area (1). Finally, the union (16) that joins the metal strips (12) of the stacks (9) corresponding to the tip zone (2) and the root zone (3) together with the metal strip (14) of the Xpacer (15) also serves as a link with the lightning down-drop (17), where the entire assembly is equipotentially bonded. This joint (16), together with the rest of the joints, is preferably a screwed joint.

Figure 5A:
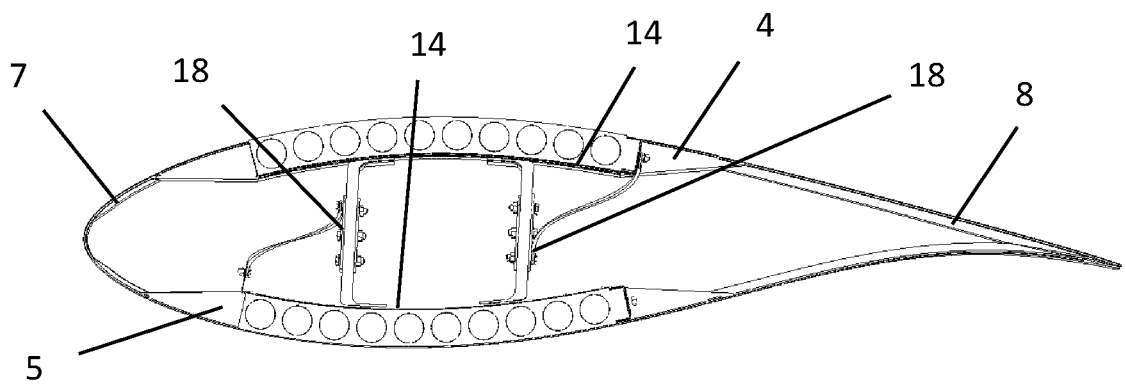
FIG. 5a is a profile section of the blade showing the upper and lower cap.
Figure 5B:
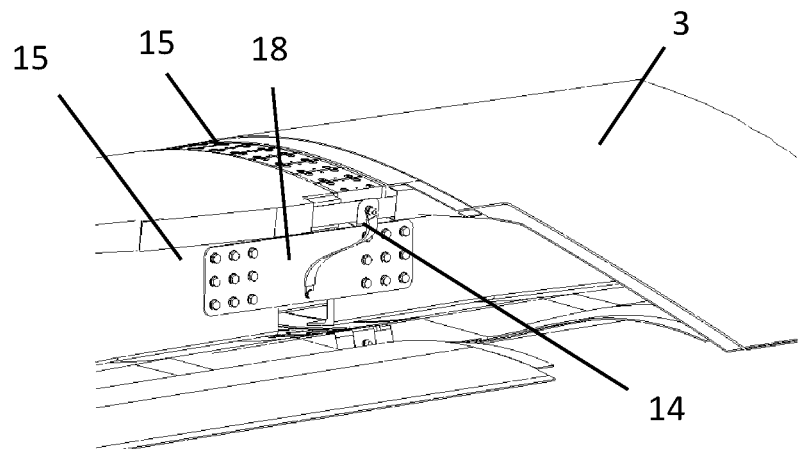
FIG. 5b shows the connection of the metal joint with the web from the trailing edge.
Figure 5C:
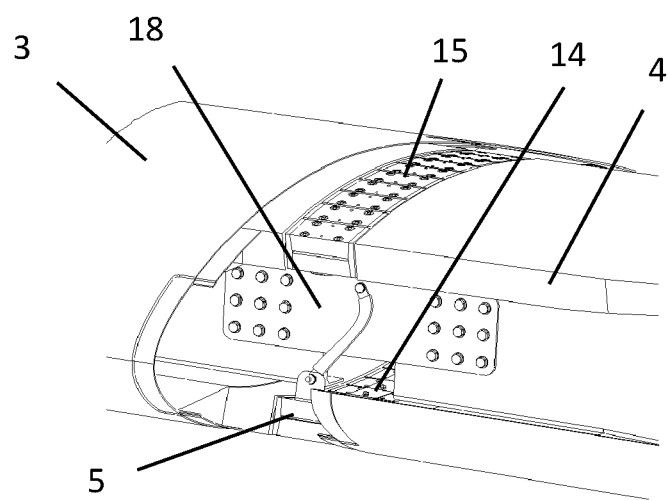
FIG. 5c shows the connection of the metal joint with the web through the leading edge.

As shown in FIGS. 5a, 5b and 5c, the cap is responsible for housing the elements of the metal joint. The Xpacers (15) have an upper and a lower surface. In these surfaces is where the corresponding metal strips (14) are screwed, both on its upper part and on its lower part.

The upper cap (4) is fitted with a metal plate that joins the webs (18) of the trailing edge (8) through a tape that is screwed to the metal strip (14) of the Xpacer (15). The lower cap (5) is fitted with the metal sheet that joins the webs (18) of the leading edge (7) through its connection with another tape that is screwed to its corresponding metal strip (14) of the Xpacers (15). Arranging the metal strips (14) at the top and/or at the bottom of the Xpacers (15) and connecting them with the plate that joins the webs (18) of the leading edge (7) or the trailing edge (8) are design solutions based on the length of the blade and the number of Xpacers (15) that make up the joint.

Figure 6:
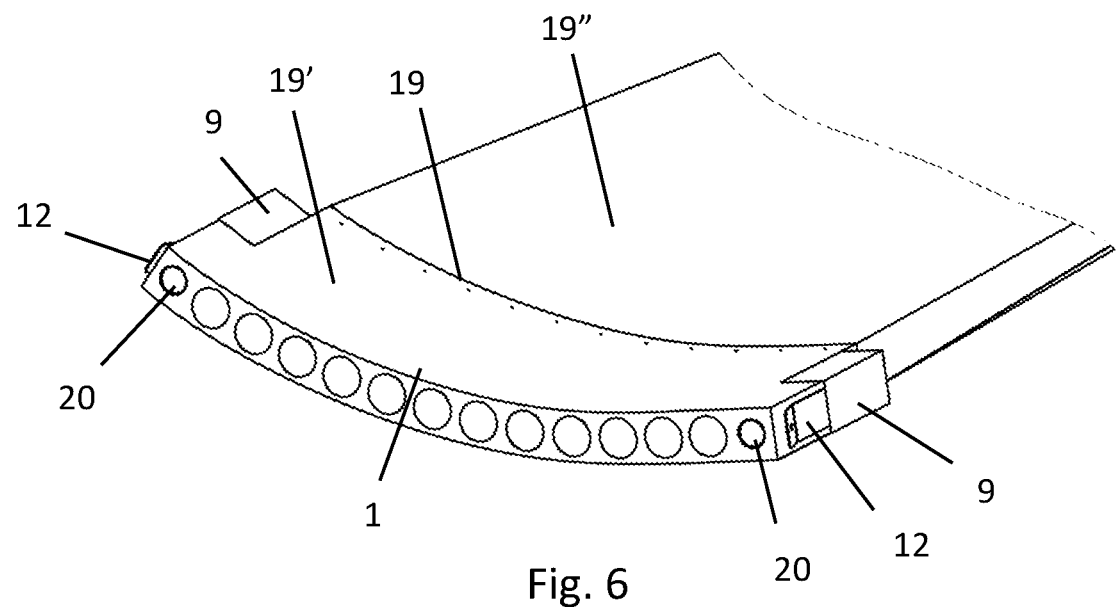
FIG. 6 shows a detail of the cap with the holes where the joining elements and the centring pins are inserted.

FIG. 6 represents the configuration of a cap and shows how its different layers are. The line (19) marks where the layer changes from the front part (19') to the back part (19"). The front part (19') are layers of constant thickness and are made up of carbon fibre and glass fibre in a ratio of approximately 80-20. This is the place where the cavities are drilled where the inserts are subsequently inserted and glued. The joint is completed by screwing the bolts inside the inserts and facing the assembly to the counterpart cap. By unscrewing the bolts of the first cap they are inserted into the counterpart. Finally, they are covered with the Xpacers and prestressed. The back part (19") are layers that narrow and lose thickness to facilitate the overlap of the preform with the rest of the blade cap.

Figure 2B:
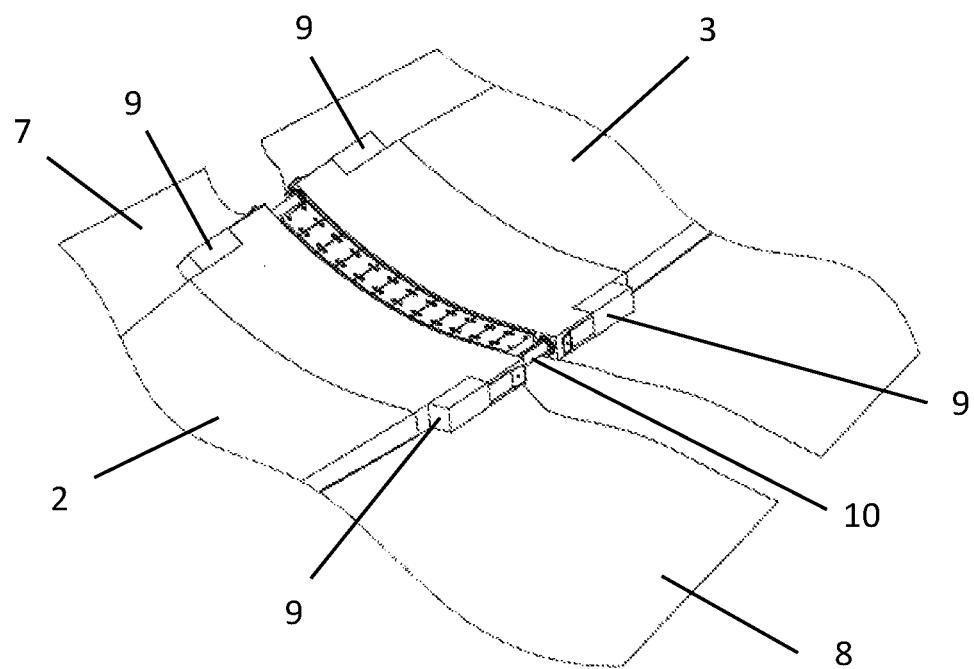
FIG. 2b shows a second embodiment where the stacking arrangement is behind blocks used by centring pins.

Two practical embodiments with a centring pin (10) and without a centring pin (10) have been described in FIGS. 2a and 2b. In the present FIG. 6, a hole (20) for the centring pin is shown on both sides of the cap. This forces the equipotential stacking (9) to be delayed and the metal strip (12) to extend from the stacking (9) to the apex of the joining zone (1). Said metal strip (12) may be shorter in the event that there is no centring pin (10).

FIGS. 7a, 7b, 7c, 7d and 7e describe the method of forming the stack (9) of equipotentially bonded layers. For reference purposes, the hole closest to the stack (9) is represented, for this practical embodiment it is the cavity of an insert, which is longer than the cavity of the centring pin. The existing layers from the hole are stacks of carbon fibre (21) and glass fibre (22) and this combination is repeated until achieving an equipotentially bonded line (23). From said line, the glass fibres (22) are replaced by a copper mesh (24) that extends beyond the end of the stack (9) leaving its protruding ends. The lower copper mesh (25) is longer than the rest of the meshes (24).

Figure 7A:
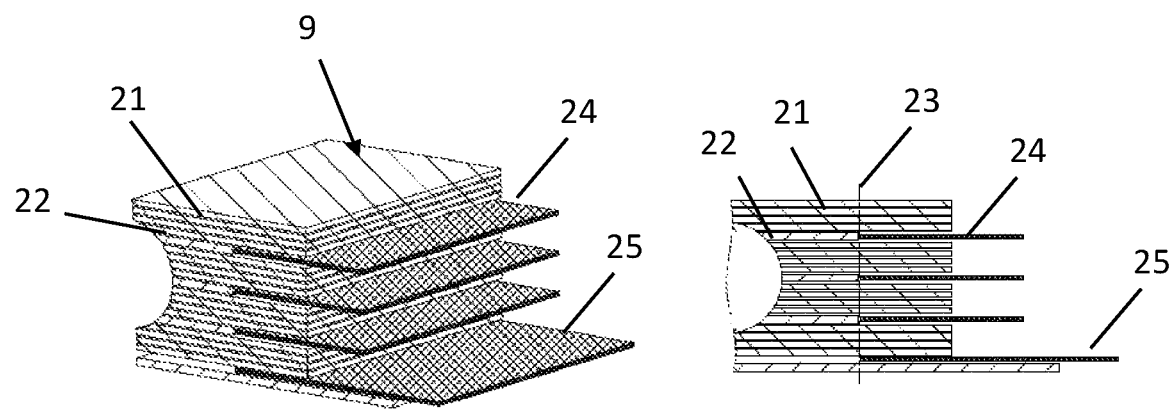
FIG. 7a shows a step of the method for equipotentially bond a stack of composite material.
Figure 7B:
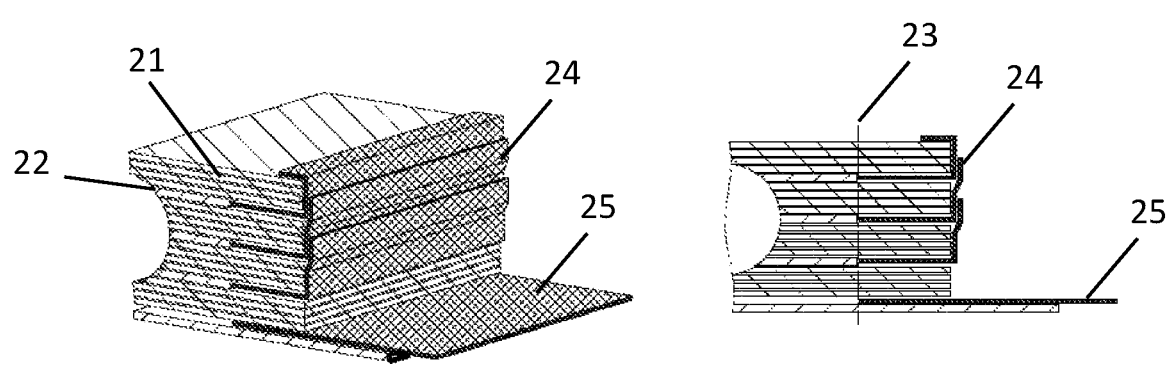
FIG. 7b shows a step of the method for equipotentially bond a stack of composite material.
Figure 7C:
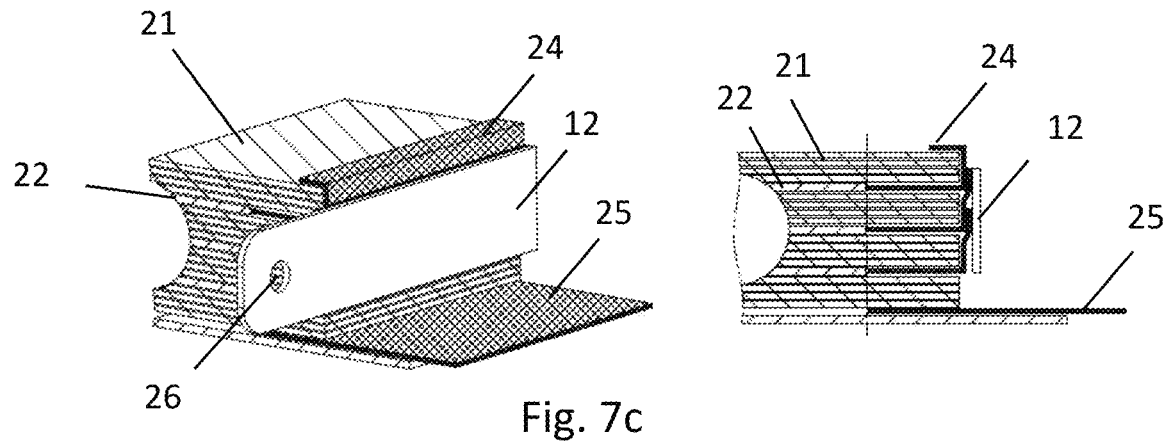
FIG. 7c shows a step of the method for equipotentially bond a stack of composite material.
Figure 7D:
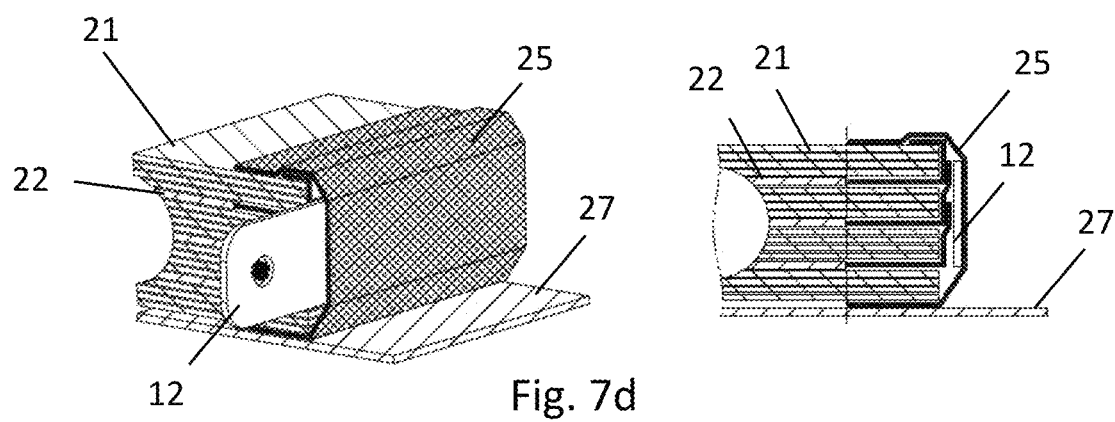
FIG. 7d shows a step of the method for equipotentially bond a stack of composite material.
Figure 7E:
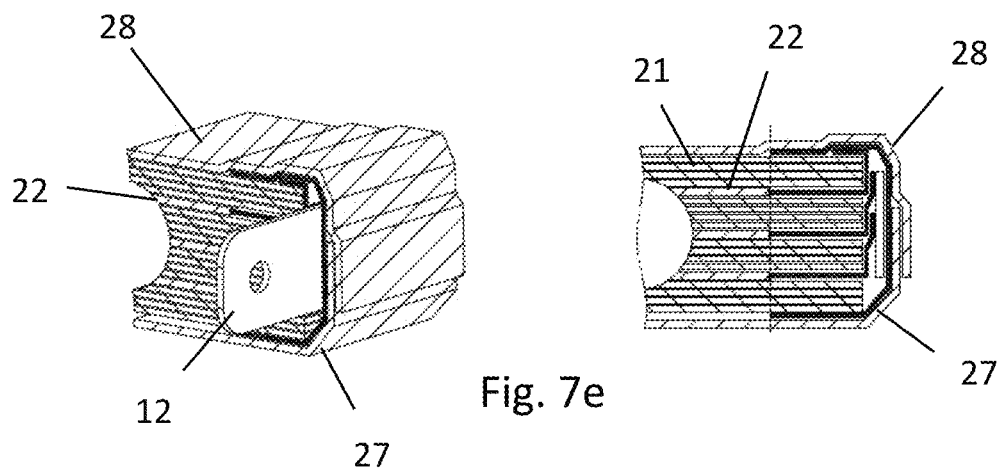
FIG. 7e shows a step of the method for equipotentially bond a stack of composite material.

As shown in FIG. 7b, the copper meshes (24) are folded towards the top of the stack (9), starting at the top and continuing at the bottom. The protruding ends of the copper meshes (24) overlap a smaller portion than the stack formed by a set of carbon fibres (21) with its corresponding glass fibre (22). The second copper mesh covers up to half of the first.

By overlapping the copper meshes (24) a wall is formed on the side of the stack (9). On said surface, the metal strip (12) is arranged, ending in a hole (26) to be able to be screwed to the metal strip (13) that joins the stack (9) of the tip (2) and the stack (9) of the root (3) indicated in FIG. 4, where the equipotential bonding line (23) is also shown. Once the metal strip (12) is arranged, the lower copper mesh (25) is folded which, thanks to its greater length, overlaps the metal strip (12) and ends at the top of the stack (9), as can be seen in FIGS. 6c and 6d.

The stack (9) depicted in all FIGS. 7a, 7b, 7c, 7d and 7e has a longer lower glass fibre layer (27), protruding from the side wall of the stack (9). Once the lower glass fibre (27) is folded, its final end is covered with the last upper glass fibre layer (28) that covers the carbon fibre (21) and the copper mesh folds (24) of the stack (9). This completes the final overlap of the two glass fibre layers (27 and 28), which favours the infusion of the whole. This cover can also be made up of a single layer.

Once the stacks (9) have been infused and the union of the modular blade has been completed, we proceed with the equipotential bonding, by screwing the metal strips (12, 13 and 14) together and with the line of the lightning downdrop (17).

The invention claimed is:

1. A system for protection against lightning strikes for a modular blade, the system comprising:
   the modular blade, the modular blade having a joint having metal joining elements, the modular blade having an internal structure comprising an upper cap on an upper side of the modular blade, a lower cap on a lower side of the modular blade, and an internal beam formed by a plurality of webs connecting the upper cap and lower cap, wherein the metal joining elements of the joint are arranged at the upper cap and the lower cap, wherein the plurality of webs are joined by at least one metal plate, wherein the upper cap, the lower cap, the plurality of webs the metal plate constitute a preform that is integrated with a blade beam of the modular blade, wherein the metal joining elements comprise a number of spacers that prestress a number of bolts screwed into inserts that are drilled, and wherein the metal joining elements comprise a composite material comprising a combination of carbon layers with glass layers joined by glue, the composite material comprising:
   a stack of carbon layers and glass layers provided proximate to a leading edge of the blade and a stack of carbon layers and glass layers provided proximate to a trailing edge of the blade arranged on a plurality of sides of the upper cap and two other stacks arranged on a plurality of sides of the lower cap,
   a first metal strip protruding from each stack and joining with: the at least one metal plate, a second metal strip that joins the spacers, a lightning cable, and a third metal strip that joins a tip cap and a root cap,
   each stack consisting of layers of carbon fibre and layers of glass fibre on one side of an equipotential bonding line and layers of carbon fibre and copper mesh on an opposite side of the equipotential bonding line, wherein a plurality of layers of copper mesh protrude from the side wall of the stack, wherein the plurality of layers of copper mesh are folded to constitute a surface where the first metal strip is attached and
   each stack is completed with a glass fibre layer that completely covers said stack.

2. The system for protection against lightning strikes for the modular blade according to claim 1, wherein a layer of the joint is formed by a 20-80 ratio of glass fibre and carbon fibre and from the equipotential bonding line is formed by copper mesh and carbon fibre in a same proportion.

3. The system for protection against lightning strikes for the modular blade according to claim 1, wherein a configuration of the joint includes a centring pin and an arrangement of the stacks fixed on the sides of the upper cap and the lower cap is separated from a joining area by a distance equal to a size of the centring pin and wherein the first metal strip extends over the distance equal to the size of the centring pin.

4. The system for protection against lightning strikes for the modular blade according to claim 1, wherein no centring pin is used, and wherein the stack has a length of 200 to 250 mm and a width of 50 to 80 mm, measured from a joint area.

5. The system for protection against lightning strikes for the modular blade according to claim 1, wherein the spacers forming the joint of the tip caps and the root caps are joined together with the second metal strip that is arranged on at least one of an upper part and on a lower part of said spacers wherein the second metal strip also joins with a joining plate of the webs.

6. A method of forming a stack comprising:
  stacking layers of carbon fibre and glass fibre up to an equipotential bonding line, and from the equipotential bonding line, replacing the glass fibres by layers of a copper mesh that extends beyond an end of the stack, the copper mesh having protruding ends, a lower copper mesh in a stack being longer than a remaining plurality of copper meshes,
  folding protruding ends of copper meshes in the plurality of copper meshes towards a top of the stack forming a wall on a side of the stack,
  arranging a metal strip on said wall on the side of the stack,
  once the metal strip is arranged, folding the lower copper mesh, which overlaps the metal strip and ends at the top of the stack,
  covering the carbon fibre and the copper mesh folds of the stack with a lower glass fibre layer and an upper glass fibre layer, and
  infusing the assembly.

7. The method of forming a stack according to claim 6, wherein folding of the copper meshes starts with an uppermost copper mesh as a first copper mesh and continues with an immediately lower copper mesh as a second copper mesh so that the second copper mesh covers up to half of the first copper mesh.

8. The method of forming a stack according to claim 6, wherein the lower glass fibre layer is longer and protrudes from the wall on the side of the stack, while a last upper glass fibre layer overlaps a previous glass fibre layer, covering the carbon fibre and the copper mesh folds of the stack, leaving a whole assembly covered by glass fibre prior to a step of infusing the assembly.

9. The method of forming a stack according to claim 6, wherein once the stack has been infused and a joint has been completed, arranging, on the wall on the side of the stack formed by the overlapping of the copper meshes, a second metal strip which is ended with a hole that is screwed to the metal strip that joins a stack tip and a stack root, and screwing the second metal strip to a third metal strip of the spacers and a lightning down-drop.

* * * * *